United States Patent [19]

Wagner

[11] Patent Number: 4,739,557

[45] Date of Patent: Apr. 26, 1988

[54] SAW BLADE FOR AN ELECTRIC COMPASS- OR KEYHOLE-SAW

[75] Inventor: Rudolf Wagner, Stuttgart-Bad Cannstatt, Fed. Rep. of Germany

[73] Assignee: Rems-Werk Christian Föll und Söhne GmbH & Co., Waiblingen, Fed. Rep. of Germany

[21] Appl. No.: 837,539

[22] Filed: Mar. 7, 1986

[30] Foreign Application Priority Data

Mar. 9, 1985 [DE] Fed. Rep. of Germany ... 8506874[U]

[51] Int. Cl.$^4$ .......................... B23D 49/04; B26B 1/00
[52] U.S. Cl. ...................................... 30/392; 30/339
[58] Field of Search ................. 30/339, 344, 392, 393, 30/394, 504, 523, 524; 83/697

[56] References Cited

U.S. PATENT DOCUMENTS

| 2,722,244 | 11/1955 | Schultz | 30/394 |
| 3,555,678 | 1/1971 | Agulnick et al. | 30/393 |
| 3,805,383 | 4/1974 | McNally | 30/92 |
| 3,905,105 | 9/1975 | Tuke | 30/393 |
| 4,553,306 | 11/1985 | Mineck | 30/392 X |

Primary Examiner—E. R. Kazenske
Assistant Examiner—Michael D. Folkerts
Attorney, Agent, or Firm—Becker & Becker, Inc.

[57] ABSTRACT

The saw blade for an electric compass- or keyhole-saw has a saw part with a tooth arrangement and a clamping part with which the saw blade is clamped between two clamping pieces of a clamping device of the compass- or keyhole-saw with a clamping screw to hold parts together in clamped relationship. The clamping part has a centering opening and a plug or insert opening for the tensioning or clamping screw. The plug or insert opening is delimited or bounded by two clamping tongues laterally thereof. The relationship or ratio of the width of the clamping part measured transverse to the longitudinal axis of the saw blade with respect to the length lies in a range of approximately 1:1.4. The relationship or ratio of the length of the plug or insert opening to the width thereof lies in a range between approximately 1:0.7 to approximately 1:1.1. The clamping tongues are constructed respectively having approximately square or rectangular shape. Because of this construction and arrangement, the saw blade can be clamped in the clamping device without gap formation. The reaction forces arising or encountered during saw operation and sawing are taken up by the clamping tongues without danger of any damage occurring and these reaction forces are conveyed into the clamping device.

8 Claims, 1 Drawing Sheet

SAW BLADE FOR AN ELECTRIC COMPASS- OR KEYHOLE-SAW

BACKGROUND OF THE INVENTION

1. Field of the Invention

The present invention relates to a saw blade for an electric compass- or keyhole-saw with a saw part which along a longitudinal side thereof is provided with a saw-tooth means and on which a clamping part is attached or adjoins the longitudinal side thereof. The saw blade with the clamping part is clampable between two clamping pieces of a clamping device of the compass- or keyhole-saw with a clamping or tensioning screw and the clamping part has a centering opening as well as an insert or plug opening through which the clamping or tensioning screw extends and also including two clamping or tensioning tongues equal in length and extending in the longitudinal direction of the saw blade, such tongues delimiting or defining the limits of the openings.

2. Description of the Prior Art

Saw blades of compass- or keyhole-saws are placed having the clamping part of such saw blades located between the two clamping pieces of the clamping device and the clamping part is clamped between the clamping pieces with the clamping or tensioning screw. U.S. Pat. No. 3,805,383-McNally issued Apr. 23, 1974, generically discloses a clamping part provided with the centering opening and the insert or plug opening. The clamping or tensioning screw passes through the insert or plug opening, while a centering pin of a lifting mechanism engages in the centering opening; the saw blade is moved back and forth with the lifting mechanism during operation of the compass- or keyhole-saw. The two clamping tongues, which extend in longitudinal direction of the saw blade and which laterally delimit or define the limits or boundaries of the plug or inside opening are made or constructed tapered in a direction toward a free end thereof. The outer sides thereof away from each other are rounded-off in a partially circular shape, while the inner sides thereof toward each other are straight and extend in a direction diverging toward the end of face side thereof. Consequently the two clamping tongues terminate respectively in a point, tip or apex. The plug or insert opening for the clamping or tensioning screw has only a small or nominal depth. A head of the clamping or tensioning screw taken in axial direction of the tensioning screw projects consequently over the ends or face sides of the clamping tongues. The clamping force produced by the clamping or tensioning screw via the head thereof consequently is not effective uniformly upon the clamping part, since the head as seen in a projection extends or projects over the clamping part. The clamping pieces, however, project so far over the ends or face sides of the clamping tongues that the screw head engages completely upon the one clamping piece. When consequently the clamping or tensioning screw is tightened, the clamping force produced by the screw head is transmitted or transferred only partially upon the clamping part. In a region in which the screw head taken in projection extends or projects over the clamping tongues in longitudinal direction of the saw blade, the clamping pieces in this region are clamped directly against each other. The consequence hereof is that at least the one clamping piece sets or adjusts slanted or at an incline so that a gap is formed between the one clamping piece and the saw blade at the end of the clamping device located opposite the clamping or tensioning screw. Consequently the saw blade during saw operation has a play transverse to the saw blade plane, which leads to a fluttering, pulsation or shimmying of the saw blade. A clean and accurate saw cut cannot be carried out any more as a result of this problem. Additionally, there exists the danger that the saw blade breaks or fails. Such a danger of breakage or failure of the saw blade also exists in the region of the clamping part. The cutting pressure arising during saw operation is conveyed into the clamping device, since the clamping part is supported with the longitudinal sides thereof away form each other along corresponding counter surfaces of the one clamping piece. Since the clamping tongues however extend into a point, tip or apex, the width thereof decreases considerably in a direction toward the free tongue end. The clamping tongue is strongly loaded or burdened during saw operation. As a consequence of the reduction of the cross section thereof, such clamping tongue however can only take up comparatively small or nominal forces. This clamping tongue then breaks off with higher or greater loading, stress or strain. Also the clamping part itself is then stressed or strained considerably at the transition to the saw part during saw operation or sawing. The clamping pieces extend only as far as to this transitional region so that only the clamping part, not, however, the saw part, is supported counter to the cutting pressure. The clamping part is comparatively narrow with known saw blade configuration. As a consequence of the stress or strain of the saw part arising during saw operation or sawing for this reason the saw blade tears at this transitional region from the clamping part to the saw part.

Saw blades are also known which at the clamping part have only a single clamping tongue, of which the outer side lies in the outer side of the clamping part. The clamping screw is so arranged in relation to the saw blade that the screw head, taken or seen in the projection upon the saw blade plane, overlaps the clamping tongue. Since only one clamping tongue, arranged eccentrically or off-center is provided, the saw blade is loaded even more unfavorably and disadvantageously than saw blades which have two clamping tongues.

SUMMARY OF THE INVENTION

An object of the present invention basically is to construct a clamping part of the saw blade of the class under consideration so that a satisfactory clamping is made possible without gap formation of the clamping device and reaction forces arising during the saw operation or sawing are taken up without danger of breakage or failure of the clamping part and/or of the clamping tongues and such reaction forces are conveyed safely into the clamping device.

This object is fulfilled with a saw blade of the class under consideration and in accordance with the features of the present invention by having the ratio or relationship of the width of the clamping part measured transversely to the longitudinal direction of the saw blade relative to the length of the clamping part, measured in longitudinal direction of the saw blade from the end or face side of the clamping tongues to the end of the teeth thereof in a region or range of approximately 1:1 to approximately 1:1.4 and furthermore that the ratio or relationship of the length of the plug or inset opening to the width thereof lies in a region or range of approximately 1:0.7 to approximately 1:1.1, and that the clamping tongues respectively are constructed having an approximately square or rectangular shape.

With the saw blade in accordance with the present invention, the clamping part with the prescribed or predetermined measurements of the clamping pieces of the clamping device is constructed so wide that reaction forces arising during saw operation or sawing are taken up safely and the clamping part can convey such reaction forces taken up thereby into the clamping device. More particularly, in the critical transitional region from the clamping part to the saw part as a consequence of the large or great width there is assured and guaranteed that also with high reaction forces, among which the saw part is loaded, stressed or strained relative to the clamping part in the saw blade plane that no failure or tearing is encountered in this transitional region. In spite of the large width of the clamping part, there is noted that the clamping part is sufficiently long in order to be able to be clamped rigidly between the clamping pieces of the clamping device. In connection with the arrangement or construction of the plug or insert opening for the tensioning screw, there is attained thereby that the clamping force can be transferred uniformly upon the upon the entire clamping part. The plug or insert opening as a consequence of the dimensional relationship or measurement ratio in accordance with the present invention can be so long that the head of the clamping screw, taken or seen in a projection upon the saw blade plane, lies completely within the clamping part. The clamping or tensioning forces are thereby transferred via the one clamping piece completely onto the clamping part. With that, the inventive saw blade is seated in the clamping device free of any tilt- and canting. Since the screw head, taken or seen in a projection upon the saw blade plane, does not project over or beyond the clamping part in the longitudinal direction of the saw blade, the clamping pieces of the clamping device can be so constructed that these clamping pieces terminate at an end with the end or face side of the clamping part. Since with that the clamping part extends over the entire length of the clamping pieces, the clamping pieces during clamping cannot tilt or cant against each other, so that the damaging gap formation between the clamping pieces is avoided with certainty. The saw blade has no inclination to flutter, pulsate, or shimmy during saw operation or sawing, but rather the saw blade is held satisfactorily in the clamping device, so that clean and accurate cuts can be carried out with the saw blade under these circumstances. A maximum degree or amount of overlap or covering of the screw head with the clamping part is attained with respect to the projection in the saw-blade plane, so that the clamping force exerted by the clamping pieces and the tensioning or clamping screw during clamping is introduced uniformly into the clamping part. As a consequence of the comparatively wide clamping part and the correspondingly deep plug or insert opening there is to be noted that the inventive saw blade can be clamped in a surprisingly straightforward and simple manner so that a clean and accurate saw cut can be carried out and performed without danger of breakage or failure of the clamping part at the transition to the saw part. Since the two clamping tongues respectively have approximately square or rectangular shaped outline or configuration, the two clamping tongues likewise are constructed and embodied comparatively wide. The clamping tongues have no taper in a direction toward the end or face side thereof so that reaction forces arising during saw operation or sawing do not lead to buckling, bending, twisting or warping deformation or breaking-off of the clamping tongues. In connection with the remaining inventive construction of the clamping part, there is assured and guaranteed thereby that high cutting forces can be applied with the inventive saw blade, without having to fear or be concerned with tearing-off of a clamping part and/or a tearing-off respectively buckling, bending, twisting, warping deformation of the clamping tongues.

These objects, and other objects and advantages of the present invention, will appear more clearly from the following specification in connection with the accompanying drawings.

DETAILED DESCRIPTION OF PREFERRED EMBODIMENT

Figure 2A:
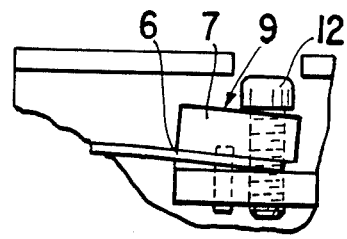
FIG. 2a is a fragmentary plan view similar to a right portion of FIG. 2 and representative of a prior art clamping device.

Referring now to the drawings in detail, the saw blade has a saw part 1 which has teeth 2 along a longitudinal side thereof. The saw part 1 in essence has a square or rectangular outline or configuration. The end or face side 3 of the saw blade extends slanted or inclined in such a manner that the longitudinal side 4 of the saw part 1 having the teeth 2 is longer than the oppositely located longitudinal side 5 extending parallel thereto. The teeth 2 preferably are made wavy, which means that the longitudinal edge of the longitudinal side 4 with the saw teeth extends in a wavy shape over the length of the saw part 1. The thickness of the entire saw blade 1 lies in a range between approximately 1 mm and 2 mm, preferably in a range between approximately 1.3 mm to approximately 1.7 mm. The saw blade furthermore has a clamping part 6, with which the saw blade is clamped between two clamping pieces 7 and 8 of a clamping device 9. The one clamping piece 8 is formed by the free end of a lifting mechanism 10, which is driven by a non-illustrated drive or motor of the compass- or keyhole-saw. The clamping piece 7 is clamped with a clamping screw 11 subject to intermediate positioning of the clamping part 6 of the saw blade against the clamping piece 8. A head 12 of the clamping screw 11 engages against the outer side of the clamping piece 7 in the clamping position.

The lifting mechanism end is provided with a centering pin or stud 13 which engages in a centering opening 14 in the clamping part 6. The clamping screw 11 with a shaft 15 thereof passes through the plug or insert opening 16 in the clamping part 6.

Figure 1:
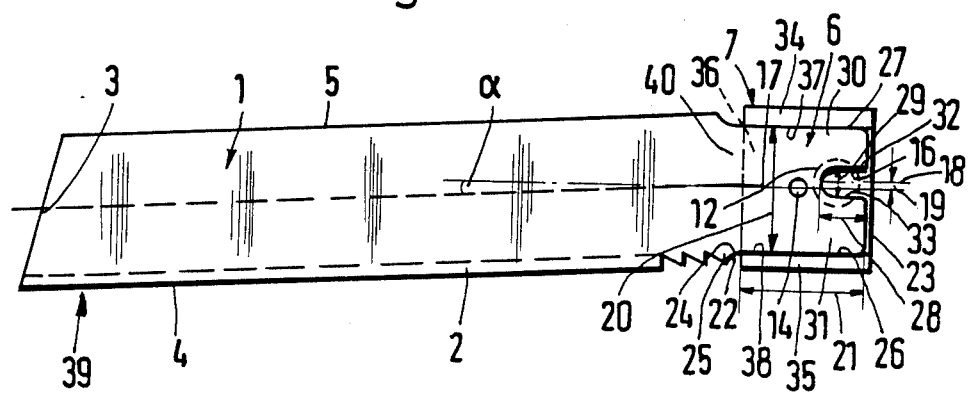
FIG. 1 is a side view of the saw blade in accordance with the present invention, which saw blade has a clamping part located in a clamping piece of a clamping device.

The saw part 1 and the clamping part 6 are located at an angle α with respect to each other, which angle, for example, can amount to approximately 2° to 4°. The centering opening 14 is located at half the width of the clamping part 6, while the plug or insert opening 16 is arranged offset in relation to the longitudinal axis 17 of the clamping part 6, so that the longitudinal axis 18 of the plug or insert opening has a spacing 19 from the axis 17 and extends parallel thereto. A reference numeral 20 in FIG. 1 designates the width of the clamping part 6 measured transverse to the longitudinal axis 17. The length 21 of the clamping part is determined by the spacing between the end 22 of the teeth 2 toward the clamping part and the end or face side 23 of the clamping part. The end 22 of the teeth 2 results from a transition of a back 24 of the last saw tooth 25 in a longitudinal side 26 of the clamping part 6 in a location away from the end or face side 3 of the saw part 1. The oppositely located longitudinal side 27 of the clamping part 6 extends parallel to the longitudinal side 26. The end or face side 23 of the clamping part 6 extends vertically or at right angles to the two longitudinal sides 26,27. The clamping part 6 consequently has a square or rectangular-shaped outline or shape. The longitudinal sides 26, 27 respectively have a curved transition into the longitudinal sides of the saw part 1, which is wider than the clamping part. As shown in FIG. 1, the clamping part 7, taken or seen in longitudinal direction of the saw blade, projects from the saw part 1 on the two sides.

The slot-shaped plug or insert opening 16 has a maximum length 28 and a width 29. The plug or insert opening is delimited or has a boundary formed by two square or rectangular-shaped clamping tongues 30 and 31, which have the same or identical length and the outer sides of which away from each other are formed by the longitudinal sides 26 and 27 of the clamping part 6. The inner sides 32 and 33 of the clamping tongues toward each other extend parallel to each other and to the longitudinal sides 26 and 27 and have an arcuate-shaped transition into each other.

The clamping piece 7 is constructed in essence U-shaped and has two legs or arms 34 and 35, which are connected with each other by a web or crosspiece 36. The clamping part 6 in the clamped position lies with the longitudinal sides 26 and 27 thereof along inner sides 37, 38 of the legs or arms 34 and 35 of the clamping piece 7 engaging toward each other (FIG. 1). Clamping piece 7 has the same or equal length as the clamping part 6 of the saw blade so that the end or face side 23 of the clamping part, which also forms the end or face side of the clamping tongues 30 and 31, lies or is located in a plane with the one end of the clamping piece 7. Consequently, the clamping part 6 engages with its entire surface against the clamping pieces 7 and 8 and is dependably, reliably, and positively supported. The clamping part 6 in the illustrated and exemplified embodiment has approximately a square or quadratic shape so that the relationship or ratio between the width 20 to the length 21 of the clamping part 7 amounts to approximately 1:1. This relationship or ratio can be varied as far as to approximately 1:1.4. Within this range, the clamping part 6 is still so wide that the clamping part can take up the reaction moments arising during saw operation or sawing without influencing the secure clamping between the clamping pieces 7,8. The preferred relationship or ratio amounts to approximately 1:1.08. There has been shown and proved that with this ratio, optimum strength, rigidity, and stability of the saw blade are attained. The width 20 of the clamping part 6 amounts to at least approximately 20 mm. A high resistance moment against bending in the saw blade plane then exists therewith. During saw operation or sawing there arises and is encountered the reaction force indicated by an arrow 39 and such reaction force tries to pivot or swing the saw blade around the centering pin or stud 13. Since the clamping part 6, however, is supported with the longitudinal sides 26 and 27 thereof against the legs or arms 34 and 35 of the clamping piece 7, very high tensile stresses or strain or tractive forces arise or are encountered in the transition region 40 between the clamping part and the saw part 1. These tractive forces with saw blades which are comparatively narrow with a predetermined thickness in this transitional region lead thereto that the saw part 1 in this transitional region tears off from the clamping part 6. Also the clamping tongue 31 is stressed or loaded as a consequence of the reaction force 39 and such conditions with the conventional saw blades lead to a bending or even to a tearing-off of this clamping tongue. Since the clamping tongue 31 however has a rectangular or square outline and configuration, the clamping tongue 31 has a high stiffness and rigidity against bending or distortion. Since the plug or insert opening 16 is arranged offset in the direction toward the longitudinal side of the clamping part 6, clamping tongue 31 has a great or large width in relation to the length 28 thereof so that also when encountering very high reaction forces there does not exist the danger that the clamping tongue is bent or deformed. The clamping tongue as a consequence of this large width in relation to the length thereof has a very high resistance moment against bending or deformation in a direction toward the oppositely located clamping tongue 30. The plug or insert opening 16 with that is provided off center in the clamping part 6 in such a manner that the clamping tongue 31 loaded or stressed for bending during the saw operation or sawing is wider than the other clamping tongue 30. With that, in a surprisingly simple and straightforward manner via the dimensions or measurements of the clamping part 6 in connection with the square or rectangular-shaped construction of the clamping tongue 31 there is reliably prevented that the saw blade upon arising or encountering of greater reaction forces breaks or is impermissibly deformed in the transition region 40 between the clamping part 6 and the saw part 1 as well as in the region of the clamping tongue 31. The saw blade in the clamping region thereof is so constructed that the saw blade can take up these high reaction forces without additional support devices.

Additionally, the clamping part 6 is clamped satisfactorily between the two clamping pieces 7 and 8 with the clamping screw 11. The ratio or relationship of the length 28 of the plug or insert opening 16 to the width 29 thereof lies in a range of approximately 1:0.7 to approximately 1:1.1. Consequently the plug or insert opening 16 is comparatively deep with reference to the length 21 of the clamping part 6. The screw head 12 consequently lies as taken or seen in projection along the saw blade plane, in a location completely within the clamping part 6. The screw head 12 is indicated with dash lines in FIG. 1. FIG. 1 shows clearly that the screw head 12 does not project over the end or face side 23 of the clamping part 6. The clamping force arising or encountered during tightening of the clamping screw 11 consequently is transferred or transmitted uniformly upon the clamping part 6, so that no tilting or canting can occur between the two clamping pieces 7 and 8 with respect to the clamping part 6. A preferred ratio of length 28 to width 29 of the plug or insert opening 16 amounts to approximately 1:0.85. The plug or insert opening 16 then has an optimum length, without encountering that the width of the plug or insert opening leads to narrow clamping tongues. They have a sufficient or adequate width in order to be able to take up the reaction forces without bending deformation. The width 29 of the plug or insert opening 16 amounts to at least approximately 6.5 mm and the length 21 of the clamping part 6 amounts to approximately 21.5 mm. There has been found and proven that with these dimensions, no weakening of the clamping tongues worth mentioning arises or would be encountered, whereby an optimum overlap extent or degree is attained between the screw head 12 and the clamping part 6.

Figure 2:
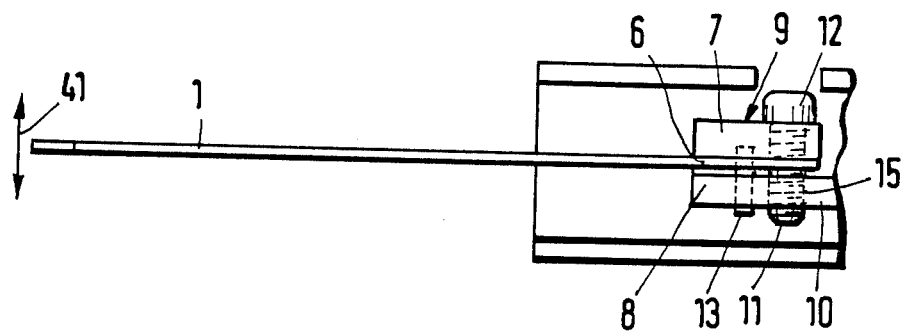
FIG. 2 is a plan view of the saw blade according to FIG. 1 in which the saw blade is clamped in a clamping device of an electric compass- or keyhole-saw.

With the known saw blades, the clamping tongues are considerably shorter so that the screw head projects over the end or face sides thereof. Upon tightening of the clamping screws, the clamping piece 7 then tilts or cants as indicated by the lines in FIG. 2a. Consequently a wedge-shaped gap forms between this clamping piece and the clamping part 6. As a consequence of this wedge-shaped gap, the saw blade is no longer satisfactorily guided in the clamping device 9. During sawing or saw operation there is noted that flutter, pulsation, or shimmying can occur transverse to the plane in the direction of the double arrow 41 in FIG. 2. This flutter, pulsation or shimmying movement of the saw blade is prevented reliably with the features in accordance with the present inventive saw blade, because screw head 12 lies within the clamping part 6 as taken or seen in the projection upon the saw blade plane. Since the clamping tongues 30, 31 extend as far as to the end of the clamping piece 7, the clamping part lies over the entire length of the clamping piece 7 between it and the lifting mechanism 10, so that a tilting or canting of the clamping piece 7 is prevented during clamping with certainty and safety. In connection with the described arrangement and construction of the clamping part 6 and the clamping tongues 30,31 there is attained in a simple and straightforward manner that the saw blade is clamped satisfactorily in the clamping device 9 and can be guided therewith. The saw blade is characterized and distinguishable by a high durability, and also can be employed with high cutting pressures.

The present invention is, of course, in no way restricted to the specific disclosure of the specification and drawings, but also encompasses any modifications within the scope of the appended claims.

What I claim is:

1. In combination, an elongated saw blade and a clamping device for an electric compass- or keyhole-saw, said saw blade being provided with a clampable part and a saw part, said saw part including tooth means along a longitudinal edge thereof, said clamping device comprising two clamping pieces having planar surfaces for contacting said saw blade and edges defing longitudinal and lateral directions along said clamping device, said clampable part of said saw blade being clampable with a clamping screw in parallel planar relation between said clamping pieces, and said saw part of said saw blade being located such that the longitudinal axis of said saw part is oriented at an acute angle relative to the longitudinal axis of said clampable part of said saw blade and of said clamping pieces, one of said clamping pieces comprising a clamping part having a centering opening located at half the lateral width of said clamping part as well as a plug or insert opening through which a clamping screw extends, as well as wo clamping tongues extending in the longitudinal direction of the saw blade and defining the limits and boundary laterally as to the plug-insert opening via the two clamping tongues extending equal in length for a satisfactory clamping of the saw blade as well as for taking up reaction forces during saw blade opertion without any danger of breakage of said clamping part and capable of conveying such reaciton forces into the clamping device, said clamping part further comprising:

the improvement wherein the ratio of the width of said clamping part measured transverse to the longitudinal direction of the saw blade with respect to the length of the clamping part measured in longitudinal direction of the saw blade from the end of clamping tongues therewith to the end of the tooth means is specifically in a range of 1:1 to 1:1.4; and the ratio of the length of the plug-insert opening to the width thereof lies specifically in a range of 1:0.7 to 1:1.1, and that said clamping tongues respectively are constructed having a squared shape that attains a high strength and security against breakage of said clamping part as well as being able to cope with high load during operation, the plug-insert opening being arranged offset in relation to a longitudinal line passing through the centering opening of the clamping part so that a central longitudinal axis of the plug-insert opening has a lateral spacing from the longitudinal line passing through the centering opening of the clamping part and extends parallel thereto.

2. A saw blade in combination according to claim 1, wherein the ratio of the width of said clamping part to length thereof amounts to approximately 1:1.08.

3. A saw blade in combination according to claim 2, wherein said ratio of length of the plug-insert opening to the width thereof amounts to approximately 1:0.85.

4. A saw blade in combination according to claim 3, wherein the length of said clamping part amounts to at least approximately 21.5 mm.

5. A saw blade in combination according to claim 4, wherein the width of the plug-insert opening amounts to at least approximately 6.5 mm.

6. A saw blade in combination according to claim 5, wherein the plug-insert opening is provided off center in the clamping part in such a manner that during a sawing operation the clamping tongue stressed for bending is wider than the other clamping tongue.

7. A saw blade in combination according to claim 6, wherein the width of said clamping part amounts to at least approximately 20 mm.

8. A saw blade in combination according to claim 7, wherein said clamping tongues are constructed having a rectangular shape.

* * * * *